United States Patent [19]

Hon

[11] 4,354,271
[45] Oct. 12, 1982

[54] FREQUENCY-CONTROLLED, UNSTABLE OPTICAL RESONATOR

[75] Inventor: John F. Hon, Tarzana, Calif.

[73] Assignee: Rockwell International Corporation, El Segundo, Calif.

[21] Appl. No.: 176,330

[22] Filed: Apr. 28, 1980

[51] Int. Cl.³ .............................................. H01S 3/08
[52] U.S. Cl. ...................................... 372/19; 372/96
[58] Field of Search ............. 331/94.5 C, 94.5 G; 372/19, 96

[56] References Cited

U.S. PATENT DOCUMENTS 3,969,685 7/1976 Chenausky et al. ........... 331/94.5 C
4,019,157 4/1977 Hutchinson et al. .......... 331/94.5 G Primary Examiner—William L. Sikes
Attorney, Agent, or Firm—H. Fredrick Hamann; Harry B. Field

[57] ABSTRACT

The lasing action in an unstable optical resonator is controlled as to frequency by limiting frequency selectivity to an axis-near beam. The control is provided preferably outside the cavity by means of active or passive elements. A passive element returns a frequency-controlled beam into the cavity, an active element injects a control beam at the desired frequency.

10 Claims, 8 Drawing Figures

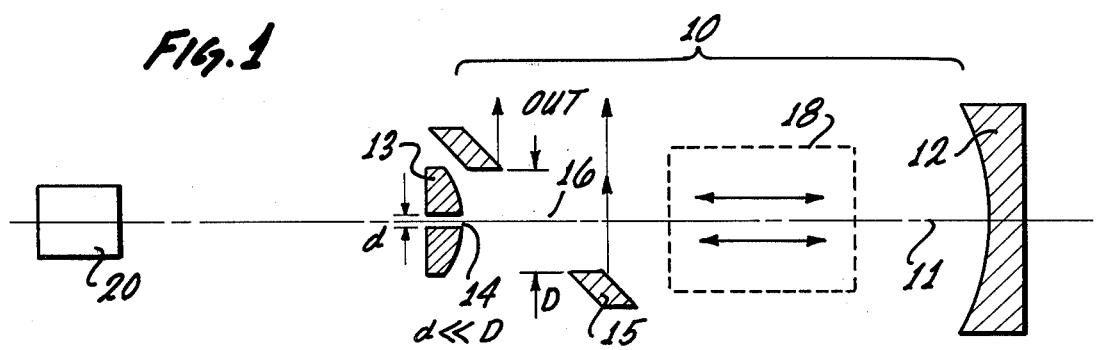
FIG. 1
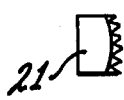  
FIG. 2  FIG. 2a  FIG. 3
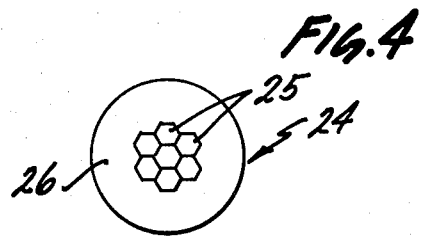
FIG. 4  FIG. 5
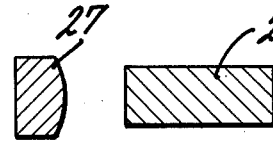
FIG. 6
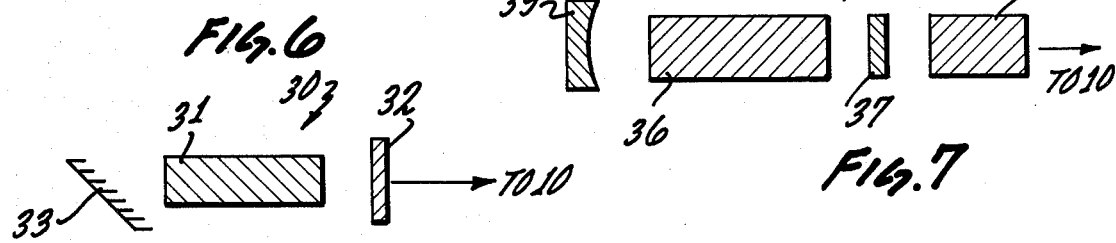
FIG. 7

FREQUENCY-CONTROLLED, UNSTABLE OPTICAL RESONATOR

BACKGROUND OF THE INVENTION

The present invention relates to lasers with unstable resonator cavities; and more particularly, the invention relates to line selection of and in such lasers.

It is inherent in many laser media that they are capable of lasing at different frequencies. Moreover, the type of stimulation involved may result in multiple line lasing and resonating in the optical laser cavity. This is particularly true in chemical lasers in which the chemical reaction produces population inversions resulting in different transitions, i.e., emission of different frequencies. In many instances, multifrequency emissions are not wanted for a variety of reasons. Among them, for example, is the possibility of absorption of the most strongly developed lines by the environment through which the emitted laser beam propagates.

Frequency selectivity of lasers in general and of unstable resonator cavities in particular has been dealt with in the past. See, for example, U.S. Pat. Nos. 4,123,149 and 3,928,817. These prior art devices have in common that the selectivity to be effective must cover the entire width of the laser beam, and uniformly so in order to be effective. This requirement poses considerable problems for the uniformity of the element or device which preforms the selection, and there are other practical limitations with large devices, particularly for lasers in which the lasing medium has a relatively large volume.

SUMMARY DESCRIPTION OF THE INVENTION

It is an object of the present invention to improve the frequency selectivity of lasers.

It is a corresponding object of the present invention to improve the frequency selectivity of optical unstable resonators.

It is a specific object of the present invention to improve the frequency selectivity of chemical or other lasers capable of multiline lasing.

It is a further specific object of the present invention to improve the frequency selectivity of optical resonators which include an optical cavity defined by curved reflectors facing each other on a common axis, there being a scraper mirror disposed in between, having a particular aperture.

The optical cavity and resonator in accordance with the further specific object is improved by including a frequency-selective element and device effective on and near the axis, but having an optically effective aperture significantly smaller than the aperture in the scraper mirror. Thus, in accordance with the principle of the invention, the reflectors defining the (primary) optical cavity of the resonator (and laser) are not made frequency selective; but control as to frequency selectivity is restricted to a beam or ray on and very near to the axis, having very little lateral extension in comparison to the width or diameter of the radiation beam as produced by and in the cavity as a whole.

For practical reasons, the frequency-selective device or element is disposed outside the cavity, and one of the reflectors has a central aperture defining the effective aperture of the frequency selectivity. The frequency-selective device may be a passive one or an active one. A passive device is, basically, a frequency-selective reflector reflecting a ray that has left the cavity through the opening in one of the reflectors and is returned therethrough but as a single frequency beam (or a beam having only selected frequencies). In the case of active control, one may use an auxiliary laser emitting just one frequency or only particular frequencies and injecting that narrow control beam through the opening in the one reflector of the principal cavity.

The principle of the invention is, thus, to eliminate relatively large surface configurations affecting a laser beam as a whole, in an attempt to render it frequency selective. By introducing the principle of single-ray, axis-near frequency control, the control operation needs to affect only a very small diameter ray or beam so that the device actually performing the function of frequency selection needs to be frequency selective only over a very small geometric area.

If a control-beam-injecting laser (active control) is used, the invention can also be interpreted as a cascade as far as frequency control is concerned. A small frequency-selective laser controls the center beam of a large nonselective laser, by rendering the latter frequency selective by operation of the control. The small, injecting laser, in turn, may have been made selective by a passively acting means within the purview of this invention.

The preferred embodiment of the invention, the objects and features of the invention, and further objects, features and advantages thereof, will be better understood from the following description taken in connection with the accompanying drawings.

DESCRIPTION OF THE DRAWINGS

FIG. 1 is a schematic view of a laser improved in accordance with the preferred embodiment of the present invention; and FIGS. 2, 2a and 3 through 7 are schematic views of different examples for a control element in the laser shown in FIG. 1.

Proceeding now to the detailed description of the drawings, FIG. 1 shows an unstable, optical resonator cavity 10 along an optical resonator axis 11 and being comprised of a concave reflector 12 and a convex reflector 13. The gain medium is depicted by 18. These elements are supplemented by a so-called scraper mirror 15 having an aperture 16. The width of that aperture in the scraper mirror is representatively given by a dimension D, transversely to optical axis 11. By way of example, dimension D may be the diameter of a circular, square-shaped or rectangular aperture or opening.

The convex mirror 13 is provided with a central bore or aperture 14 whose width is given by a diameter dimension d. The aperture or bore 14 has preferably a circular cross-section, but it may be rectangular or square-shaped. It is now significant that dimension d. is substantially smaller than dimension D; possibly being one or more orders of magnitude apart. The large dimension D permits utilization of extended gain regions. The aperture 14 is centrally traversed by the optical axis 11.

An optical control element, or system 20, is disposed outside the optical cavity proper, but can be deemed a portion thereof under some circumstances. This control element injects or selects a beam of a single or of a few frequencies to be transmitted through bore 14 into cavity 10. Several examples for this device 20 will be given below. Suffice it to say that a beam of a single frequency or limited numbers of frequencies is injected through bore 14 into the cavity. That beam is very narrow on account of the dimensions of bore 14 and propagates right on axis 11 toward reflector 12.

The device 20 includes at least one reflecting surface which participates in the transmission of the frequency-selected and controlled ray on axis 11 into (or back into) cavity 10. This reflecting surface of and in device 20 may define a second resonating cavity, together with the center of reflector 12, to be attuned to the particular line to be selected. That cavity extension can be understood to extend radially from axis 11 at a distance therefrom, in the plane of reflector 13, of less than d/2. As far as the width of bore or opening 14 is concerned, (dimension d), that width should be about equal to the width of one Fresnel zone. For maximum practicability, a larger opening is not needed; a smaller opening may be optically impractical. The origin of the particular Fresnel zone cone is the optical center point of reflector 12.

The lasing medium 18 contained in cavity 10 is for example, a mixture of diluent and excited DF or HF, or CO, or $CO_2$, etc. It would be more appropriate to say that the optical cavity 10 is being passed through, or flowed through, by a gas or mixture of gases containing at least one laser-active component. It should be noted, however, that the particular lasing mechanism is not of any direct significance for practicing the preferred embodiment of the invention. The invention deals particularly with frequency selectivity of an optical resonator. Particulars of the optical gain medium are incidental, except that the invention can be applied in all those cases in which the lasing medium is capable of spontaneous emission at more than one line.

As far as the frequency-selective control is concerned, consider the center axis region of the cavity. Due to the presence of bore 14, reflector 13 does not reflect any radiation at its center. Thus, the center beam (any center beam) in the cavity propagating toward reflector 12 is exclusively determined by the radiation from controller 20. Due to diffraction at bore 14, that center beam assumes a slightly diverging wave front so that a portion, when reflected by mirror 12, will not leave cavity 10 again through opening 14, but will be reflected by mirror 13. Multiple, gain-producing reflections occur until the beam is captured by the scraper mirror and reflected out of the system. Radiation following this pattern will dominate so that, indeed, the output beam has the selected frequency or frequencies only. Other frequencies may still establish some gain, but from an overall point of view, the functionality of the device is improved by limiting operation to a single one, or to but a few, of the possible lines. Furthermore, in some types of lasers, the energy in the nonselected lines is transferred to the selected lines, thus retaining their energy but utilizing it more favorably.

The control element 20 can be any of a variety of devices. These may be classified as passive and active devices. The former use light from cavity 10, the latter inject a particular frequency into the cavity via bore 14. In the case of an active device, a narrow beam of the selected frequency or frequencies is injected into cavity 10 through opening 14. As stated, some diffraction occurs and a slightly diverging control beam will reach reflector 12 and be returned. Most of the control beam will not leave the cavity but will miss opening 14 on return and be reflected back by reflector 13. Each traversal of cavity 10, increases the gain until the beam is captured by the scraper mirror.

If device 20 is a passive device, the control beam is produced from radiation that has left cavity 10 through opening 14. That radiation is not yet frequency-selected, but device 20 is presumed to return (reflect) radiation having only (or predominantly) the selected frequency or frequencies.

A central portion of the wave front of this passively produced control beam leaves opening 14 for cavity 10 and will be returned by reflector 12 through opening 14, towards the reflecting surface in device 20. That portion traverses the gain medium several times and is, thus, significantly augmented. Moreover, this particular reflecting surface in passive device 20 resonates optically with reflector 12.

On each passage of the center beam through opening 14, some diffraction occurs and a portion of the beam is, so to speak, laterally branched off so that a dynamic equilibrium is maintained in the center region of the cavity. Since the diameter d of bore 14 is considerably smaller than the width of the laser medium 18 in cavity 10 and the diameter D of aperture 16 in the scraper mirror 15, the center beam will experience many gain-increasing reflections between the mirrors 12 and 13 before such a beam is deflected by mirror 15.

FIG. 2 illustrates a passive device in the form of a convex (spherical) Littrow grating 21. FIG. 2a illustrates the grating in front view. The device is oriented in such a way that a Littrow frequency is returned on and along axis 11. The returned beam will be slightly wider than the diameter of aperture 14; but only an axis-near, single-frequency component is returned into the cavity. It should then be noted that this convexity of device 21 introduces an additional diverging component into the returned beam, augmenting the diffraction at opening 14. However, device 21 could have a planar surface as diffraction suffices to obtain divergence of the control beam.

FIG. 3 illustrates an alternative, somewhat simpler and less exacting frequency selection. The element 22 is a spherical mirror with a thin coating 23, attuned to the frequency to be selected. The coating 22 is of the $\lambda/2$ type and will suppress lines outside its return response range. This type of element has a relatively large bandwidth and is suitable only if the other lasing lines of the gain medium 18 are well outside this band.

FIG. 4 illustrates a selecting device 24 in front view. The device includes several Littrow elements 25. These elements are arranged on a slightly convex surface of a carrier element 26. The purpose of this arrangement is to simulate a spherical surface of this boundary for the secondary central optical resonator cavity, the other boundary being the central portion of reflector 12. This convex arrangement of Littrow elements compensates for the fact that axis-near beams, leaving cavity 10 and traversing opening 14, also have a converging component. Thus, Littrow elements outside the dead center portion have to have a slightly different angle in order to ensure uniform blazing angles and, thus, proper frequency selectivity.

The passive device shown in FIG. 5 is of particular simplicity; it includes a spherical mirror 27, having a high nonselective reflectivity or a frequency-selective surface. In addition, the device includes an adsorber cell 28 which attenuates unwanted frequencies. One will choose such an adsorbing device in cases in which the frequency selectivity does not have to be restricted to a single frequency.

By way of example, it may be the purpose of the laser beam to be generated, to traverse the atmosphere over a long distance with little or no attenuation. Thus, the laser should emit radiation of only those frequencies which will not be attenuated by the atmosphere. Certain wavelengths of the frequencies which the medium 18 is capable of producing, will be suitable in this regard; others will be strongly attenuated by water, i.e., moisture. Consequently, the laser should not waste its energy content by lasing at these frequencies; the production of gain should be restricted to those frequencies which will not be adsorbed by atmospheric moisture. In furtherance of this objective, the center beam of the laser should be controlled to be limited to these desired frequencies. The cell 28 in FIG. 5 may be filled with water vapor. The multifrequency beam from cavity 10 along an axis 11 will pass through cell 28, and some wavelengths will be attenuated, others will not or to a lesser degree. The cell 28 will, therefore, automatically select all frequencies which will not, or only very little, be attenuated by atmospheric moisture.

FIG. 5 introduces still another aspect; the particular cell 28 does not have any critical dimensions in any direction transverse to the beam propagation and traversal. However, it would be highly impractical to insert such a cell into cavity 10, and having a width equal to the width of the beam resonating in the cavity. The direct exposure to the radiation in cavity 10 would render the device extremely hot. Limiting the frequency control to a narrow, axis-near beam, outside cavity 10, ensures ready dissipation of a relatively small amount of absorbed radiation and makes such control practical.

FIG. 6 illustrates an active device. In particular, this figure illustrates a laser 30 which includes a lasing medium 31, a semitransparent mirror 32, and a frequency-selective, e.g., Littrow, grating 33. The lasing medium 31 should be the same or the same kind as medium 18 in FIG. 1 so that lasing conditions are identical as far as the media are concerned. Reflector 33 singles out the desired frequency and laser 30 emits, in fact, a monochromatic beam. This narrow beam is injected into cavity 10 through aperture 14 and serves as prime control beam. Diffraction at aperture 14, possibly augmented by a slightly diverging component of the beam itself ensures that a portion of the frequency selected control beam is captured by the cavity 10 and will not leave again through opening 14.

FIG. 7 illustrates an active device analogous to FIG. 5. One may say that the passive reflector 27 has been replaced by a laser cooperating with an absorber cell 38. This particular laser 35, is basically a small version of the principal laser. There is a lasing medium 36, a semitransparent mirror 37, and a rear reflector 39. Laser 35 may have no frequency selectivity at all; frequency selectively is provided by cell 38, containing the particular frequency-selective absorber material for frequency-controlling the center beam as injected and returned to the laser cavity 10 (FIG. 1). The cell 38 can also be located within the laser cavity mirror 39 and 37.

The various figures illustrate various ways of controlling the center beam in the laser cavity by means of devices outside the cavity, but being disposed and effective directly on the axis; the effectiveness is obtained through the aperture or opening 14 which determines the lateral or width dimension of the injected or returned control beam. The control element 20 does not have to have comparable, small dimensions. It should be as small as possible, simply for reducing the difficulties in obtaining a high degree of accuracy (frequency selectivity) over a particular area. On the other hand, the smaller the effective diameter and cross section of device 20, the more accurately it has to be positioned and retained on the axis. It can thus be seen that there is a trade-off in making the device 20 larger than needed as far as the size of aperture 14 is concerned, but only to the extent needed for ensuring retention of its position on and in relation to axis 11 within reasonable tolerances.

In principle, there is no need for placing the control of the center beam outside the cavity and/or directly in line with axis 11. Rather, one may use for example, a very small filter or filter cell inside cavity 10, and having width dimensions comparable to the dimension of bore 14 in FIG. 1; but in this case one will not need such a bore. Alternatively, one may place a very small, 45-degree mirror into the cavity and on axis 11; and one may inject or introduce, otherwise, a control beam laterally. In all of these instances, the respective element and device inside cavity 10 must have very small dimensions transverse to axis 11 to effectively restrict control to the axis' beam. This was found to be less practical from a point of view of mounting; and so the arrangement of the type shown in FIG. 1 is clearly preferred and demand to be the best mode.

The invention is not limited to the embodiments described above; but all changes and modifications thereof, not constituting departures from the spirit and scope of the invention, are intended to be included.

I claim:

1. In an unstable optical resonator, having a concave reflector, a convex reflector facing the concave reflector on a common axis, and a scraper mirror, having an aperture and being traversed by the axis, the improvement of frequency-selective means located outside the optical cavity defined by said reflectors and serving to reflect only radiation of preselected frequency in beams directly on or very nearly on the axis and having an effective aperture significantly smaller than the aperture of the scraper mirror.

2. The improvement of claim 1 wherein one of the reflectors is formed with an aperture defining said effective aperture.

3. The improvement of claim 2, said frequency-selective means being a frequency-selective reflector.

4. The improvement of claim 2, said frequency-selective means being a reflector combined with a frequency-selective absorber.

5. The improvement of claim 2, said frequency-selective means being a relatively small frequency-selective laser, injecting a beam of selected frequency or frequencies through said aperture in the one reflector and a cavity defined by said reflectors, said unstable resonator including an active media and a pump source within the environment of said unstable resonator.

6. In an unstable optical resonator, which includes first and second reflectors, defining a resonator cavity having an axis, and aperture means limiting the width of a beam resonating in the cavity, a frequency-selective means located outside said cavity having an effective aperture much smaller than an aperture as defined by the aperture means, for reflecting only preselected frequencies on or nearly on the axis.

7. The improvement as in claim 6, the frequency-selective means being disposed outside the cavity and including a frequency-selective reflecting means.

8. The improvement as in claim 6, the frequency-selective means being disposed outside the cavity and including laser means for injecting a very narrow beam, having the frequency or frequencies to be selected, into the cavity, said unstable resonator including an active media and a pump source within the environment of said unstable resonator.

9. The improvement as in claim 6, wherein the frequency-selective means is a frequency-selective absorber.

10. The improvement as in claim 2 or 6, the effective aperture having a width of about one Fresnel zone.

* * * * *